United States Patent
McLellan

Patent Number: 6,097,800
Date of Patent: Aug. 1, 2000

[54] NETWORK CONTROLLED TELEPHONE FOR THE VISUALLY IMPAIRED

[75] Inventor: Scott W. McLellan, Kempton, Pa.

[73] Assignee: Lucent Technologies, Inc., Murray Hill, N.J.

[21] Appl. No.: 09/264,669

[22] Filed: Mar. 9, 1999

[51] Int. Cl.[7] .................................................. H04M 17/00
[52] U.S. Cl. ........................ 379/144; 379/114; 379/355; 455/460
[58] Field of Search ..................................... 379/112, 114, 379/144, 214, 216, 88.12, 88.16, 88.18, 88.19, 88.2, 88.22, 88.23, 88.25, 354, 355, 356; 455/405, 406, 460

[56] References Cited

U.S. PATENT DOCUMENTS

| | | | |
|---|---|---|---|
| 5,550,899 | 8/1996 | Mcleod et al. ............................ | 379/216 |
| 5,608,788 | 3/1997 | Demlow et al. ......................... | 379/142 |
| 5,675,607 | 10/1997 | Alesio et al. . | |
| 5,719,926 | 2/1998 | Hill . | |
| 5,737,701 | 4/1998 | Rosenthal et al. . | |
| 5,758,286 | 5/1998 | Leppanen ................................ | 455/445 |
| 5,822,413 | 10/1998 | Dunn et al. .............................. | 379/114 |
| 5,835,570 | 11/1998 | Wattenbarger .......................... | 379/214 |
| 5,845,205 | 12/1998 | Alanara et al. . | |
| 5,859,897 | 1/1999 | Furman et al. . | |
| 5,912,956 | 6/1999 | Longo et al. ............................ | 379/144 |

*Primary Examiner*—Curtis A. Kuntz
*Assistant Examiner*—Rexford N. Barnie
*Attorney, Agent, or Firm*—Dickstein Shapiro Morin & Oshinsky LLP

[57] ABSTRACT

A networked controlled telephone system and method for the visually impaired. The system and method provides a visually impaired caller with a calling card and calling card account. The system and method stores a predetermined list of authorized telephone numbers for the calling card. Calls made to the telephone numbers on the predetermined list are the only calls that can be charged to the calling card without adding a further personal identification number. If the user desires to call a telephone number not on the list, the personal identification number is entered prior to entering the telephone number. Thus, the financial risk attributable to calling card theft greatly reduced for both the owner and service provider. Moreover, simplified codes are associated and stored with each predetermined telephone number. When a visually impaired caller uses the card to place calls, the caller need only enter the simplified code to place the call. Thus, the calling card is suitable for use by a visually impaired caller.

25 Claims, 5 Drawing Sheets

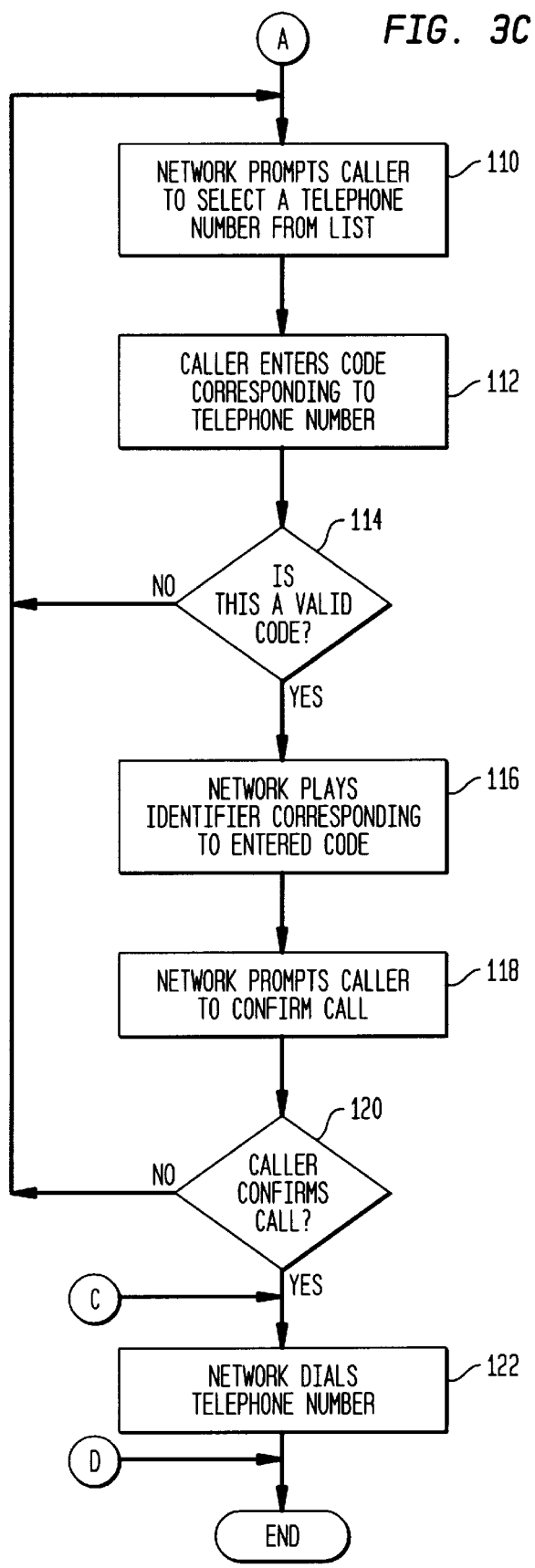

NETWORK CONTROLLED TELEPHONE FOR THE VISUALLY IMPAIRED

BACKGROUND OF THE INVENTION

1. Field of the Invention

The present invention relates to the field of telephone calling cards and services and, more particularly to a network controlled telephone for the visually impaired.

2. Description of the Related Art

Calling cards have become increasingly popular in today's society. These cards allow a user to charge the cost of telephone calls to the calling card account. Typically, the caller indicates that the telephone call should be charged to the calling card account by dialing a special telephone number, dialing the calling card number and a personal identification number (PIN) and then dialing the number to be called. The costs are billed to the caller on a monthly basis. Thus, the caller only has to pay for calls, even calls made at a public or pay telephone, once a month as long as the telephone calls are charged to the calling card account.

Visually impaired callers have difficulty dialing telephone numbers and paying for their telephone calls when they are placed at a public or pay telephone. A calling card could be used to help the visually impaired caller pay for telephone calls made at public or pay telephones. When a visually impaired caller has a calling card, however, the caller encounters difficulty entering not only the telephone numbers, but also the calling card account number and PIN.

In addition, calling card theft has increased over the years. A thief in possession of another's calling card may be able to charge numerous telephone calls, particularly long distance telephone calls, to the stolen calling card account before the rightful owner of the card has discovered the theft and canceled the card. Oftentimes, the original owner of the card gets stuck with the bill. Sometimes, the owner can persuade the calling card service provider not to bill them for the calls when the owner proves that the card was stolen. In this scenario, it is the calling card service provider that loses money. Today, these service providers are losing a great deal of money every time unauthorized users, i.e., thieves, charge calls to stolen calling cards.

The calling card service provider, which typically is also the telephone service provider, relies on the use of the PIN to counteract the theft of calling cards. As stated earlier, however, the visually impaired caller has difficulty dialing the PIN as well as dialing the telephone and calling card numbers. Other service providers have begun using pre-paid calling cards to counteract calling card theft. In theory, these cards are less attractive to a thief because they are limited by dollar amount and thus, limited in the amount that can be charged to the card. However, a thief is not prevented from making calls once the thief gets a hold of the card. Here, it is the purchaser of the pre-paid card that suffers the loss. Thus, there is a desire and need for a calling card and calling card service that is suitable for use by a visually impaired caller while also limiting the financial risk of the calling card account owner and service provider.

SUMMARY OF THE INVENTION

The present invention provides a calling card and calling card service that is suitable for use by a visually impaired caller.

The present invention also provides a calling card and calling card service that limits the financial risk of the calling card account owner and service provider.

The above and other features and advantages of the invention are achieved by providing a networked controlled telephone system and method for the visually impaired. The system and method provides a visually impaired caller with a calling card and calling card account. The system and method stores a predetermined list of authorized telephone numbers for the calling card. Calls made to the telephone numbers on the predetermined list are the only calls that can be charged to the calling card without adding a further personal identification number. If the user desires to call a telephone number not on the list, the personal identification number is entered prior to entering the telephone number. Thus, the financial risk attributable to calling card theft greatly reduced for both the owner and service provider. Moreover, simplified codes are associated and stored with each predetermined telephone number. When a visually impaired caller uses the card to place calls, the caller need only enter the simplified code to place the call. Thus, the calling card is suitable for use by a visually impaired caller.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 3a–3c illustrate in flowchart form a second exemplary process for providing a network controlled telephone for the visually impaired in accordance with another embodiment of the present invention.

DETAILED DESCRIPTION OF PREFERRED EMBODIMENTS

Figure 1:
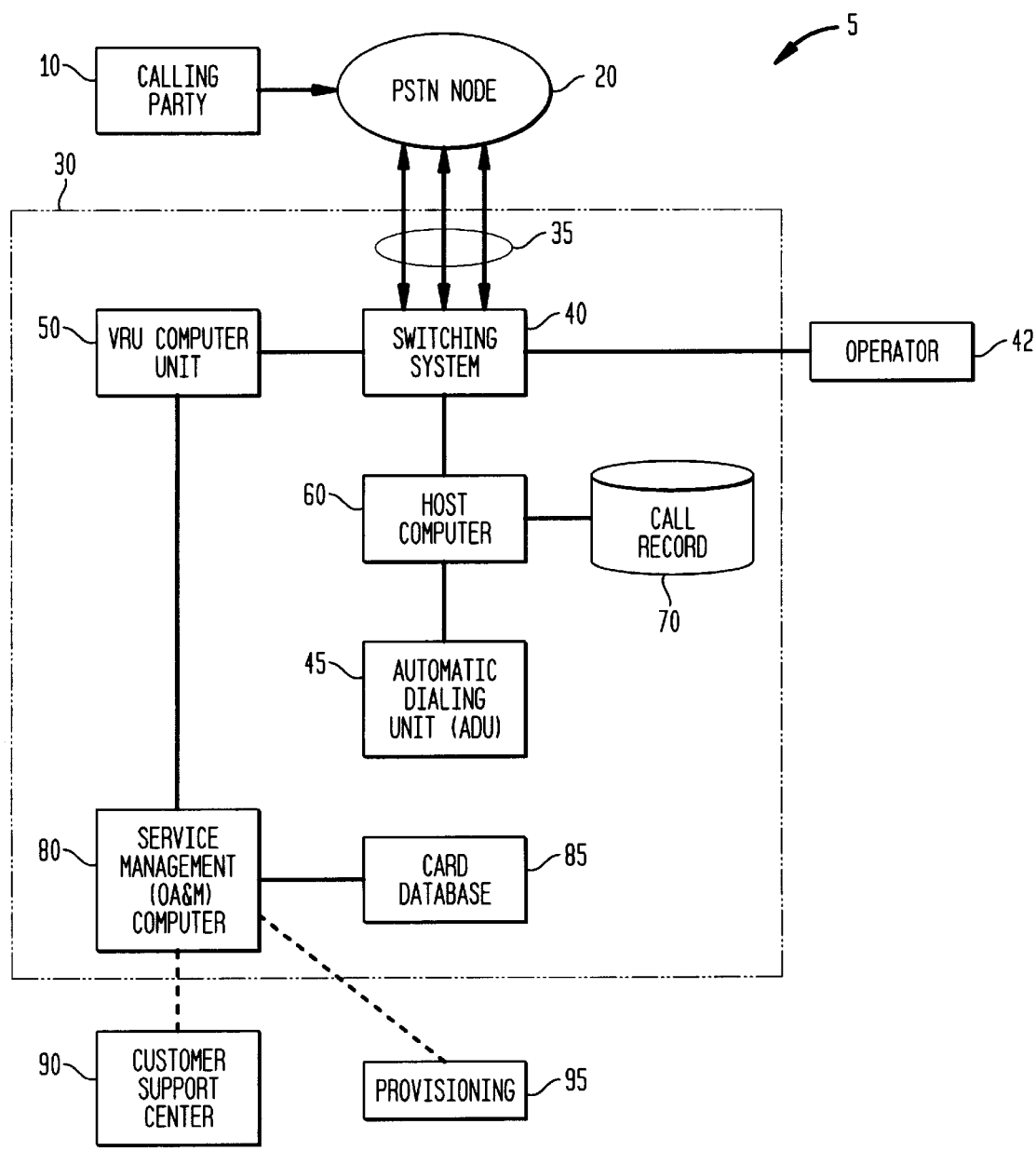
FIG. 1 illustrates an exemplary telephone network providing a network controlled telephone for the visually impaired constructed in accordance with the present invention.

FIG. 1 illustrates an exemplary telephone network 5 providing a network controlled telephone for the visually impaired constructed in accordance with the present invention. The network 5 permits a visually impaired calling party to initiate a telephone call to one of a predetermined list of authorized telephone numbers without having to remember or dial the telephone number. The network 5 also charges the caller's account for the placed telephone calls and thus, the caller can also place the call from a public or pay telephone without having currency or a credit card to pay for the call. The method of the present invention will be described below with references to FIGS. 2–3c.

The calling party is connected to the called number through one or more nodes in a public switched telephone network (PSTN). FIG. 1 shows an interaction between an end user or calling party 10 with one PSTN node 20. The node 20 may comprise a telecommunications switching system located in a central office. The switching system may be a switching system located in a network provided by a local exchange carrier (LEC) such as one of the regional Bell operating companies. Typically, there are plurality of nodes 20 in a public switched telephone network.

In addition to the network node 20, the architecture of FIG. 1 includes a calling card service platform 30 connected to the network node 20. The platform 30 may be co-located with the network node 20 or remotely located with respect to the node 20. The platform effectuates the network controlled telephone service of the present invention in conjunction with the usual equipment contained in a public switched telephone network. The platform 30 contains an end office digital switching system 40 connected to the network node 20 via one or more central office trunk facilities collectively designated by reference numerical 35. For example, the switching system 40 may be connected to the central office switching system in node 20 by one or more conventional T1 trunks, ISDN channels, or analog lines, as needed. The switching system 40 performs call processing functions for telephone calls between the platform 30 and the network node 20. The call processing functions of the switching system 40 are controlled by a host computer 60 operating in conjunction with a call record database 70. An automatic dialing unit (ADU) 45 interacts with host computer 60 to automatically dial any predetermined and recorded telephone numbers. An operator 42 may also interact with the switching system 40. It is to be understood that a back-up switching system, host computer, and call record database may also be used to serve as redundant systems in the event of primary system failure.

The calling card service platform 30 also contains a voice response computer unit (VRU) 50 which performs voice response functions related to call setup and call takedown. The VRU computer 50 communicates with the caller to assist the caller in making the telephone call. The VRU computer 50 is connected to the switching system 50 through appropriate communication lines.

The architecture of FIG. 1 also contains a service management computer 80 which manages a card database 85. The database 85 contains relevant information about each outstanding card and its account number. In the exemplary embodiment of the invention, the information includes a list of pre-selected authorized telephone numbers associated with each calling card account number and a one or two-digit code associated with each number on the list. As will be described below with reference to FIGS. 2–3c, the one or two-digit codes will be used by the visually impaired caller to initiate a call to an authorized telephone number associated with the code so that the telephone number can be dialed without the caller having to enter the entire telephone number. The call will also be charged to the calling card account number which allows the caller to make the call from a pay phone without having currency or a credit card.

Preferably, the database 85 will also include an identifier or description for each telephone number on the list. The identifier can merely be the actual telephone number or it can be a description of the party associated with the telephone number. As will be described below, the description such as "Tom's home" or the associated telephone number can be played to the caller so that the caller can confirm that the correct authorized telephone number has been chosen from the list.

Moreover, the database 85 may also contain a personal identification number (PIN) associated with each account number. Although a PIN is not necessarily required to place a call to one of the predetermined numbers associated with the caller's account number, the PIN maybe used to allow the caller to place calls, and charge them to the caller's account, to telephone numbers that are not on the list. This would be useful, for example, in situations where one of the telephone numbers on the list has been changed and the caller has not had a chance to modify the list.

All of the database information can be stored in the database 85 when the calling card service is initiated. This can be performed by any method. For example, the caller or a representative of the caller can fill out a list of authorized telephone numbers and descriptions when applying for the card. The caller could also supply the list of authorized telephone numbers, etc. after receiving the card by placing a call to the network 5 and speaking with an operator who can update the caller's account information. Likewise, the information stored in the database 85 can also be modified, updated or deleted as desired by the caller. Again, this can be performed by any method. The above-mentioned PIN may also be used to authenticate the person making changes to the information stored in the database 85.

In addition to managing the card database 85, the service management computer 80 also performs operations, administration, and maintenance (OA&M) operations for the platform 30. The service management computer 80 also provides a gateway for remote access to the services platform 30. For example, there may be a customer support center 90 which is capable of reading the information contained in the platform 30 and a provisioning system 95 which is able to read-in information already in the platform, as well as write other information into the platform, such as updates to the information stored in the card database 85 (pre-set telephone numbers, etc.) and entry of new software into the platform 30. It is to be understood that redundant systems may also be used to back-up each of the aforementioned elements of FIG. 1.

Figure 2:
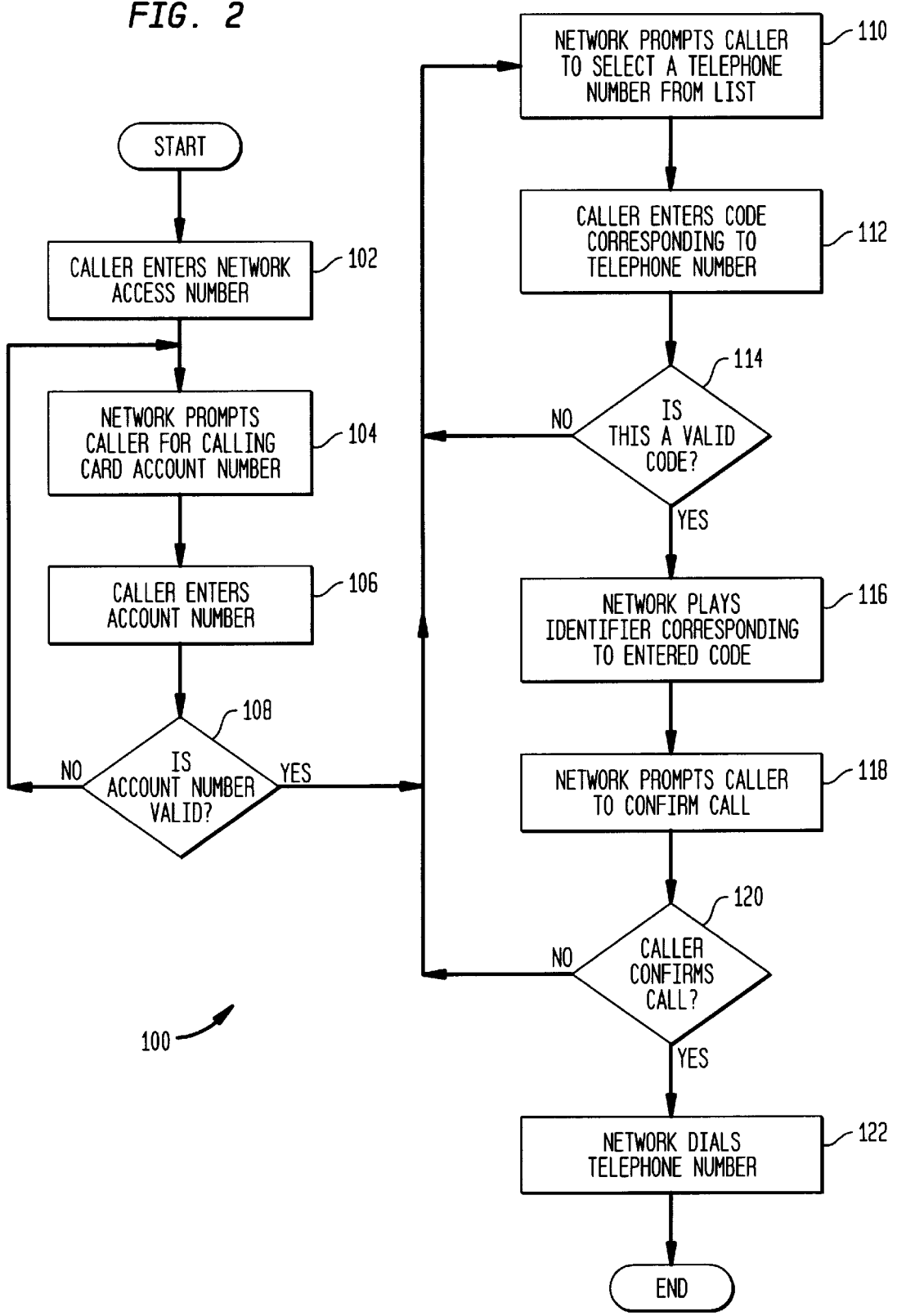
FIG. 2 illustrates in flowchart form a first exemplary process for providing a network controlled telephone for die visually impaired in accordance with an embodiment of the present invention.

FIG. 2 illustrates in flowchart form a first exemplary process 100 for providing a network controlled telephone for the visually impaired in accordance with a first embodiment of the present invention. Preferably, the method 100 operates on a telecommunication network, such as the network 5 illustrated in FIG. 1. Initially, at step 100, a visually impaired caller enters a network access number at a telephone. The network access number could a special telephone number associated with the provider of the calling card. It is desirable, however, that the network access number be a two or three digit code, such as 11 or 000, that the network switch recognizes as a special services call. Alternatively, the network access number could be stored on the card as part of the calling card account number. Once the network access number is entered, the network prompts the caller for the calling card account number (step 104). The prompt may be in the form of a special tone, series of tones or a voice prompt. For example, the network can state "please enter your calling card account number now."

At step 106, the caller enters the calling card account number. Preferably, the account number can be entered by swiping the calling card through a calling card reader that is provided in most of today's conventional pay or public telephones. The account number could also be entered verbally by the caller which could then be interpreted by the VRU (FIG. 1) or by a human operator. The account number could also be entered by dialing or depressing the keys on the telephone keypad although this is the least desirable method for doing so. At step 108, the entered account number is verified by the network. That is, the network, particularly the OA&M computer 80 of FIG. 1, compares the entered account number to the account numbers stored within the card database.

If at step 108 it is determined that the entered account number is invalid (i.e., the entered number does not match any of the currently existing account numbers stored in the card database), the method 100 continues at step 104 where the network prompts the caller to enter the calling card account number (so that the valid account number can be entered). In addition, the network will keep track of the number of times an invalid account number has been entered. If the number of times that an invalid account number has been entered exceeds a predetermined number of allowed times to enter the account number, the network will disconnect the call and the method 100 will terminate (i.e., will not continue at step 104). If at step 108, it is determined that the entered account number is valid (i.e., the entered number matches one of the currently existing account numbers stored in the card database), the method 100 continues at step 110.

At step 110, the network prompts the caller to select one of the pre-selected authorized telephone numbers. Again, the prompt could be a tone, series of tones or a verbal prompt such as "select telephone number from list." At step 112, the caller enters the one or two-digit code corresponding to one of the pre-selected authorized telephone numbers. The one or two-digit code could be entered verbally by the caller which could then be interpreted by the VRU or by a human operator. The one or two-digit code could also be entered by dialing or depressing the keys on the telephone keypad.

At step 114, it is determined if the entered one or two-digit code is a valid code for the entered account number and thus, the caller's calling card. That is, the network compares the entered one or two-digit code to the pre-selected codes stored in the card database that are associated with the entered account number. If at step 114 it is determined that the entered code is invalid (i.e., the entered code does not match any of the stored codes associated with the entered account number), the method 100 continues at step 110 where the network prompts the caller to select one of the pre-selected authorized telephone numbers (so the caller can select a new one or two-digit code). In addition, the network will keep track of the number of times an invalid code has been entered by the caller. If the number of times that an invalid code has been entered exceeds a predetermined number of allowed times to enter the code, the network will disconnect the call and the method 100 will terminate (i.e., will not continue at step 110) or connect an operator to assist in completing the call (not shown).

If at step 114 it is determined that the entered one or two-digit code is valid (i.e., the entered code matches one of the stored codes associated with the entered account number), the method 100 continues at step 116. At step 116, the network plays the identifier corresponding to the entered code to the caller. As stated above, the identifier could be the actual telephone number to be dialed such as "202-555-9191" or the identifier could be can be a description of the party associated with the telephone number such as "Tom's home." It is desirable for the identifier to be a description of the party being called so that the visually impaired caller is fully aware of the party being called.

At step 118, the network prompts the caller to confirm the forthcoming call. At step 120, it is determined if the caller has confirmed the call. The call can be confirmed verbally by the caller which could then be interpreted by the VRU or by a human operator. The call could also be confirmed by dialing or depressing a key on the telephone keypad. If at step 120 it is determined that the caller has not confirmed the forthcoming call, the method 100 continues at step 110 where the network prompts the caller to select one of the pre-selected authorized telephone numbers (so the caller can eventually select and confirm a call to an authorized telephone number). In addition, the network will keep track of the number of times the caller has failed to confirm the call. If the number of times that the caller has failed to confirm the call exceeds a predetermined number of allowed times that the caller can fail to confirm the call, the network will disconnect the call and the method 100 will terminate (i.e., will not continue at step 110) or connect an operator to assist in completing the call (not shown). If at step 120 it is determined that the caller has confirmed the forthcoming call, the method 100 continues at step 122 where the network dials the telephone number selected by the caller (via the one or two-digit code).

Figure 3A:
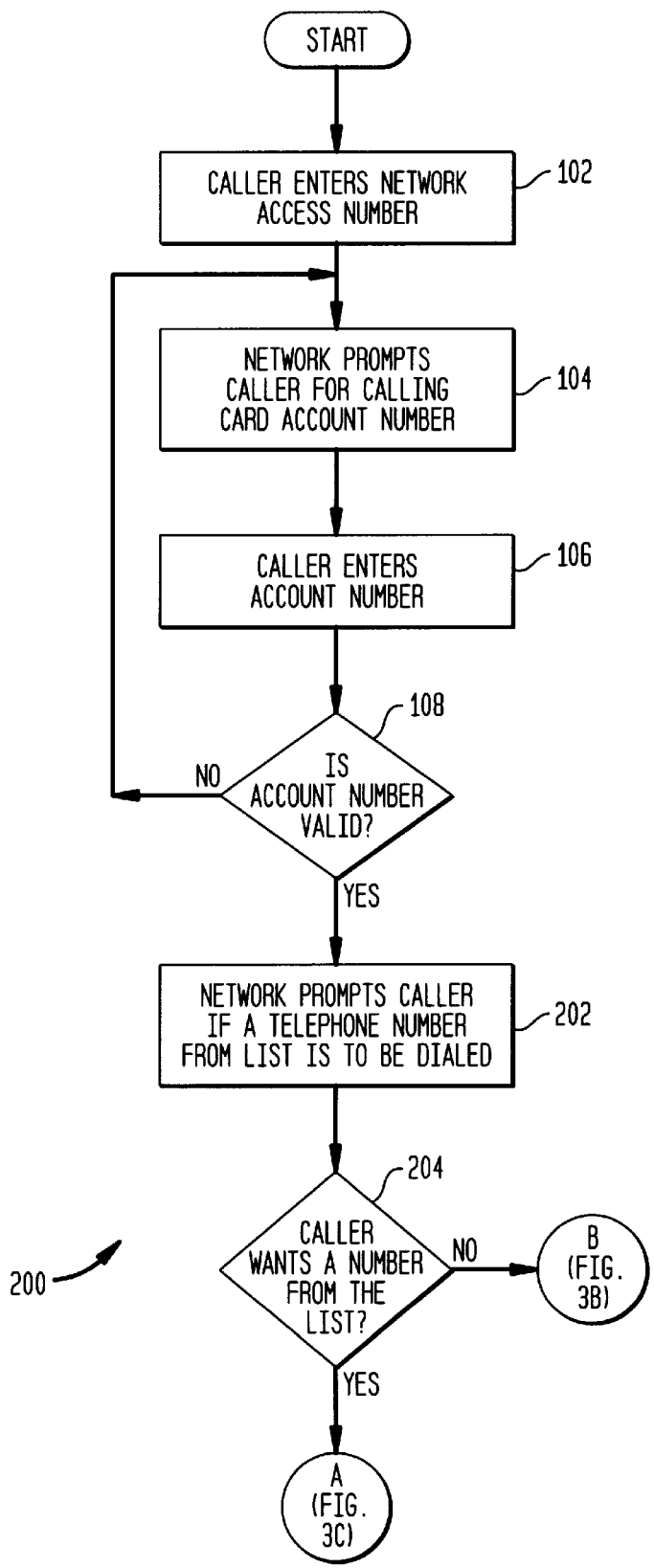
Figure 3B:
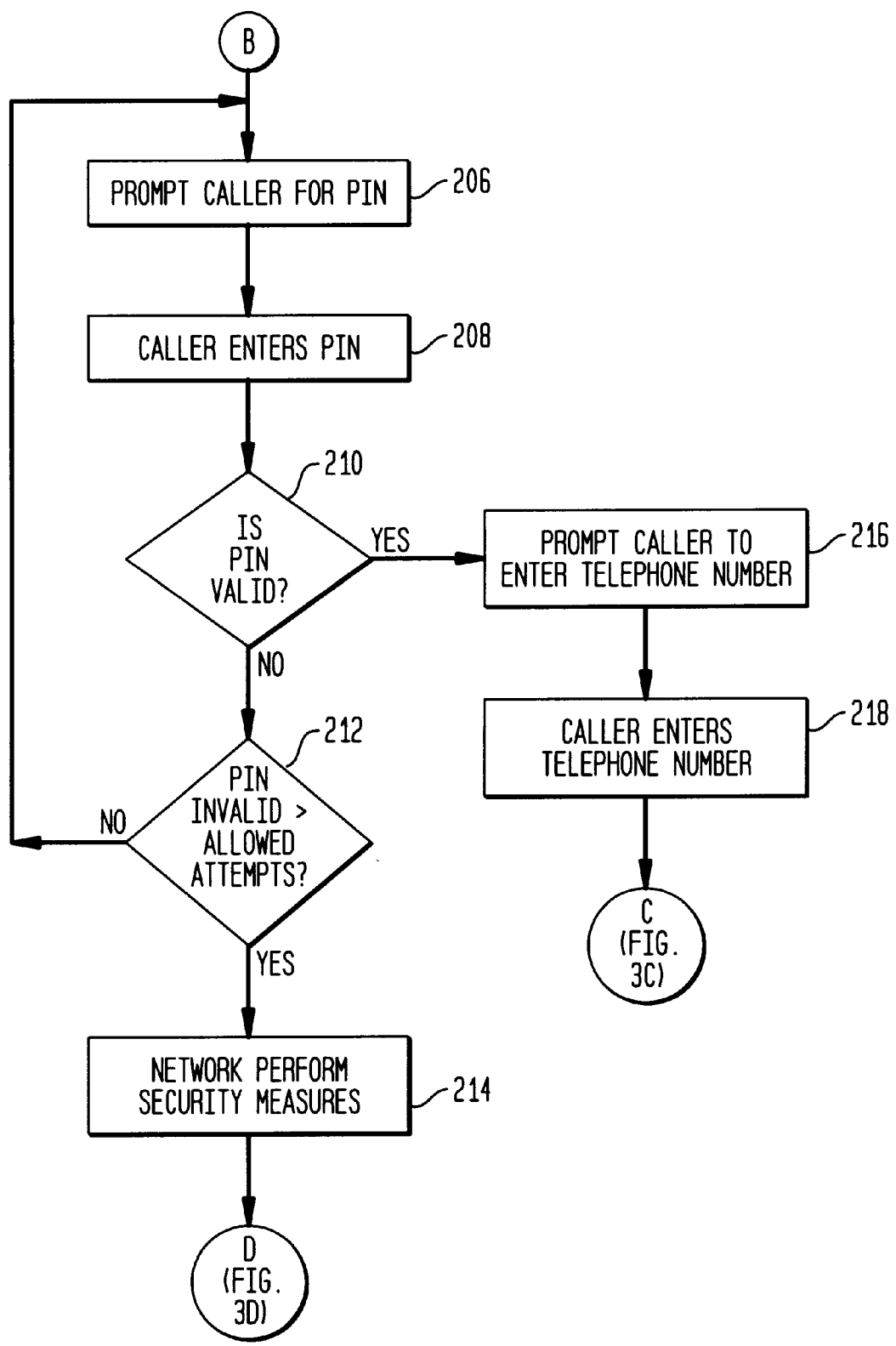

FIGS. 3*a*–3*c* illustrate in flowchart form a second exemplary process 200 for providing a network controlled telephone for the visually impaired in accordance with another embodiment of the present invention. Preferably, the method 200 operates on a telecommunication network, such as the network 5 illustrated in FIG. 1. The method 200 is essentially the same as the method 100 illustrated in FIG. 2 with the exception that it allows calls to telephone numbers that are not on the pre-selected list of authorized numbers if the caller enters a valid personal identification number (PIN). As stated above with reference to FIG. 1, this would be very useful for example, in situations where one of the telephone numbers on the list has been changed and the caller has not had a chance to modify the list. Moreover, it would also be useful in emergency situations. Like numerals are used to refer to lice method steps found in the method 100 of FIG. 2 and are not discussed in detail for convenience purposes.

Referring to FIGS. 3*a*–3*c*, it can be seen that once the caller enters the calling card account number (steps 104–106), the network verifies the entered account number at step 108. If at step 108 it is determined that the account number is invalid, the method continues at step 104 where the caller is prompted to enter the calling card account number (so that the valid account number can be entered). As stated above, the network may disconnect the call or connect an operator if the account number has been entered incorrectly more than a predetermined allowed number of times that the account number can be entered. If at step 108 it is determined that the account number is valid, the method continues at step 202 where the network prompts the caller if a telephone number from the pre-selected list is to be dialed.

At step 204, it is determined if the caller has chosen to dial a telephone number that is from the pre-selected list of authorized telephone numbers. If at step 204 it is determined that the caller wishes to dial a number from the pre-selected list, the method 200 continues at step 110 and proceeds to prompt the user for a one or two-digit code as discussed above with reference to FIG. 2. If at step 204 it is determined that the caller wishes to dial a telephone number that is not on the pre-selected list of authorized telephone numbers, the method 200 continues at step 206 where the caller is prompted to enter a PIN. Alternatively, the user could enter a predetermined code, e.g., 99, which indicates that a non-pre-selected telephone number is desired, prompting input of a PIN from the user.

At step 208, the caller enters the PIN for the calling card. The PIN could be entered verbally by the caller which could then be interpreted by the VRU or by a human operator. The PIN could also be entered by dialing or depressing the keys on the telephone keypad. At step 210, it is determined if the entered PIN is valid for the entered account number. If the entered PIN is not valid, the method continues at step 212. At this step, the method 200 determines how many times the caller has entered an incorrect PIN. This number of invalid PIN entries is then compared to a predetermined allowed number of invalid PIN attempts. If the number of invalid PIN entries is greater than the number of allowed attempts, the method continues at step 214 where the network performs security measures since there is a high probability that the calling card was stolen. The security measures could include disconnecting the call, invalidating the card, tracing the call or any other measure deemed suitable by the calling card service provider. If the number of invalid PIN entries is not greater than the number of allowed attempts, the method continues at step 206 where the caller is prompted to enter a PIN (so that the caller can enter the correct PIN). No security measures are taken at this point, but a fee could be charged to the caller for the inconvenience.

If at step 212 it is determined that the caller has entered a valid PIN, the method 200 continues at step 216 where the network prompts the caller to enter a telephone number. At step 218, the caller enters a telephone number. The telephone number could be entered verbally by the caller which could then be interpreted by the VRU or by a human operator. The telephone number could also be entered by dialing or depressing the keys on the telephone keypad. Once the telephone number is entered, the method 200 continues at step 122 and proceeds to dial the telephone number as described above with reference to FIG. 2.

It should be appreciated that the present invention is suitable for other individuals and is not to be limited solely to the visually impaired. For example, the present invention would be suitable for the elderly and young children who may need assistance in placing and paying for telephone calls. In these situations, the charges to the calling card could be paid by a third party such as a guardian or parent. The small list of authorized telephone numbers ensures the third party that the charges to the card will be limited. Moreover, the present invention could be given to students from their parents to control the students' telephone costs.

It should be noted that the present invention can be used with any type of telephone. The caller can use a private, pay, wireless or cellular telephone, for example, since the network is responsible for provisioning the telephone in accordance with the calling card. It should also be noted that the present invention does not require the use of prompts to guide the caller through the methods 100, 200 of the present invention. Although prompting the caller is desirable, it is not necessary to practice the invention. Moreover, the present invention does not have to disconnect the call if the caller fails to confirm the call or enters the incorrect account number or code more than the predetermined number of allowed times. For example, an operator could intervene to determine if the calling card has been stolen or if the caller simply needs help in using the card.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of providing a communications service, comprising:

receiving at a communication network call information from a user, said call information comprising a service account number and a call code corresponding to a telephone number;

verifying that said call code is an authorized code for said account number by comparing said call code to a predetermined list of authorized codes for said account number; and if said call code is an authorized code, providing to the user an audible identifier associated with said call code that identifies said telephone number and automatically dialing said telephone number associated with said call code, wherein said audible identifier is retrieved from a predetermined list of audible identifiers associated with the predetermined list of authorized codes and provides the user with an option to confirm the automatic dialing of said telephone number.

2. The method of claim 1 further comprising the steps of prompting the user to confirm if said telephone number should be dialed.

3. The method of claim 1 wherein said audible identifier is a description of a party associated with said telephone number.

4. The method of claim 1 wherein said audible identifier is said telephone number.

5. The method of claim 1 further comprising the step of prompting the user to enter said call information which occurs prior to the step of receiving said call information.

6. The method of claim 1 wherein said call information is received from the user over a telephone call to a network access telephone number.

7. The method of claim 1 wherein said call code is a one-digit code.

8. The method of claim 1 wherein said call code is a two-digit code.

9. The method of claim 1 further comprising the steps of:

prompting the user if a telephone number that does not correspond to a call code associated with said account number should be dialed; and if it is determined that a telephone number that does not correspond to a call code associated with said account number should be dialed, prompting the user for personal identification number, verifying that the personal identification number is valid for said account number, and if said personal identification number is valid, prompting the user to enter a telephone number and automatically dialing said telephone number that does not correspond to a call code associated with said account number.

10. The method of claim 9 wherein said method further comprises the step of invalidating the service account number if said personal identification number is invalid.

11. The method of claim 9 wherein said method further comprises the step of disconnecting the user from the network if said personal identification number is invalid.

12. A method of providing a communications service, comprising:

receiving at a communication network call information from a user, said call information comprising a service account number;

verifying that said account number is valid; and if said account number is valid, receiving from the user a call code corresponding to a telephone number, verifying that said call code is an authorized code for said account number by comparing said call code to a predetermined list of authorized codes for said account number, and if said call code is an authorized code, providing to the user an audible identifier associated with said call code that identifies said telephone number and automatically dialing said telephone number associated with said call code, wherein said audible identifier is retrieved from a predetermined list of audible identifiers associated with the predetermined list of authorized codes and provides the user with an option to confirm the automatic dialing of said telephone number.

13. A telecommunication system, comprising:
an automatic dialer for dialing a telephone number;
a computer readable storage medium, said medium having a database of service accounts stored thereon, each service account having at least one code corresponding to an authorized telephone number and an audible identifier associated with each code corresponding to an authorized telephone number; and
a processor coupled to said automatic dialer and said storage medium, said processor receiving call information from a user, said call information comprising a user account number and user code, said processor verifying that said user code is an authorized code for said user account number, if said user code is an authorized code, providing to the user an audible identifier retrieved from said storage medium and associated with said user code that identifies said telephone number and controlling said automatic dialer to automatically dial said telephone number associated with said user code, wherein said identifier provides the user with an option to confirm the automatic dialing of said telephone number.

14. The system of claim 13 wherein said processor prompts the user to confirm if said telephone number should be dialed.

15. The system of claim 13 wherein said audible identifier is a description of a party associated with said dialed telephone number.

16. The system of claim 13 wherein said audible identifier is said dialed telephone number.

17. The system of claim 13 wherein said processor prompts the user to enter said call information.

18. The system of claim 13 wherein said processor verifies said user code by locating said user account within said database of service accounts and comparing said at least one code of said service account to said user code.

19. The system of claim 13 wherein said processor prompts the user if a telephone number that does not correspond to a code contained within a service account of the user should be dialed, and if it is determined that a telephone number that does not correspond to a code contained within a service account of the user should be dialed, said processor prompts the user for a personal identification number, verifies that the personal identification number is valid for said user account number, and if said personal identification number is valid, prompts the user to enter a telephone number that does not correspond to a code contained within a service account of the user and controls said automatic dialer to automatically dial said entered telephone number.

20. The system of claim 19 wherein said processor invalidates said service account number if said personal identification number is invalid.

21. The system of claim 19 wherein said processor disconnects the user from said system if said personal identification number is invalid.

22. A telecommunication apparatus, comprising:
means for receiving call information from a user, said call information comprising a service account number and a call code corresponding to a telephone number;
means for verifying that said call code is an authorized code for said account number by comparing said call code to a predetermined list of authorized codes for said account number;
means for providing to the user an audible identifier associated with said call code that identifies said telephone number if said call code is an authorized code; and
means for automatically dialing said telephone number associated with said call code if said call code is an authorized code, wherein said audible identifier is retrieved from a predetermined list of audible identifiers associated with the predetermined list of authorized codes and provides the user with an option to confirm the automatic dialing of said telephone number.

23. A telephone network, comprising:
means for receiving call information from a user, said call information comprising a service account number;
means for verifying that said account number is valid;
means for receiving from the user a call code corresponding to a telephone number;
means for verifying that said call code is an authorized code for said account number by comparing said call code to a predetermined list of authorized codes for said account number;
means for providing to the user an audible identifier associated with said call code that identifies said telephone number; and
means for automatically dialing said telephone number associated with said call code, wherein said audible identifier is retrieved from a predetermined list of audible identifiers associated with the predetermined list of authorized codes and provides the user with an option to confirm the automatic dialing of said telephone number.

24. A method of providing a communications service, comprising:
receiving at a communication network call information from a user, said call information comprising a service account number and a code corresponding to a telephone number;
verifying that said code is an authorized code for said account number;
if said code is an authorized code, providing to the user an audible identifier associated with said code that identifies said telephone number and automatically dialing said telephone number associated with said code;
prompting the user if a telephone number that does not correspond to a code associated with said account number should be dialed; and
if it is determined that a telephone number that does not correspond to a code associated with said account number should be dialed, prompting the user for personal identification number,
verifying that the personal identification number is valid for said account number,
if said personal identification number is valid, prompting the user to enter a telephone number and automatically dialing said telephone number that does not correspond to a code associated with said account number,
and if said personal identification number is invalid, tracing a telephone call made by the user to the network.

25. A telecommunication system, comprising:
an automatic dialer for dialing a telephone number;
a computer readable storage medium, said medium having a database of service accounts stored thereon, each service account having at least one code corresponding to an authorized telephone number; and a processor coupled to said automatic dialer and said storage medium, said processor receiving call information from a user, said call information comprising a user account number and user code, said processor verifying that said user code is an authorized code for said user account number, if said user code is an authorized code, providing to the user an audible identifier associated with said user code that identifies said telephone number and controlling said automatic dialer to automatically dial said telephone number associated with said user code, said processor further prompts the user if a telephone number that does not correspond to a code contained within a service account of the user should be dialed, and if it is determined that a telephone number that does not correspond to a code contained within a service account of the user should be dialed, said processor prompts the user for a personal identification number, verifies that the personal identification number is valid for said user account number, and if said personal identification number is valid, prompts the user to enter a telephone number that does not correspond to a code contained within a service account of the user and controls said automatic dialer to automatically dial said entered telephone number, and if said personal identification number is invalid said processor traces a telephone call made by the user to said system.

* * * * *